United States Patent Office 3,166,524
Patented Jan. 19, 1965

3,166,524
POLYMER SYSTEMS AND METHOD OF
PREPARATION THEREOF
Claude J. Schmidle, Moorestown, N.J., Robert S. Shaw,
Philadelphia, Pa., and George L. Brown, Moorestown,
N.J., assignors to Rohm & Haas Company, Philadelphia, Pa., a corporation of Delaware
No Drawing. Filed Feb. 13, 1961, Ser. No. 88,633
13 Claims. (Cl. 260—23)

This invention is concerned with novel improved polymer compositions and methods of making them.

In accordance with the present invention, novel, advantageous polymer compositions are obtained by polymerization of one or more polymerizable ethylenically unsaturated monomers, preferably containing a single group $H_2C=C<$ imparting polymerizability to the monomer, in an organic solvent in which the polymer obtained is insoluble but is maintained in stable dispersed state by a polymeric dispersing agent soluble in the organic solvent, the addition in liquid condition of a complemental or modifying material such as a film-forming or plasticizing material soluble in, or miscible with, the organic solvent, and then, if desired, removing some or substantially all of the solvent so that the polymer produced becomes dispersed in the form of insoluble particles in the complemental material. The use of the term "complemental" herein is not intended to exclude the addition of other components to the compositions or in any way to imply that the complemental material is always present in the composition in an amount that is less than the amount of dispersed polymer. This application is a continuation-in-part of copending applications Schmidle et al., Serial No. 758,892, filed September 4, 1958, and Schmidle et al., Serial No. 53,377, filed September 1, 1960.

The complemental material may be a liquid or a solid at normal room temperature (20° C.). If a liquid, it may be mixed into the polymer dispersion at room temperature, but if a solid, it is first melted before mixing it in and the polymer dispersion is also at a temperature above the melting point of the solid. In the latter instance, a solid composition is obtained after removal of solvent and cooling and the polymer in the composition becomes redispersed on heating the composition to a temperature above the melting point of the complemental material.

The polymer dispersions with which the complemental material is to be compounded may be prepared in any suitable fashion. For example, any of the methods disclosed in copending U.S. applications for Letters Patent, Serial Nos. 758,892, filed September 4, 1958, and 53,377, filed September 1, 1960, and any of the polymer dispersions therein disclosed may be used and the entire disclosures of those two applications are incorporated herein by reference. Those applications disclose the polymerization, in a hydrocarbon solvent medium containing dissolved therein (1) a hydrocarbon-soluble polymer selected from the group consisting of natural rubbers, diene polymers, polyisobutylenes, oil-soluble polymers formed exclusively of monoethylenically unsaturated molecules comprising at east one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers, and oxidative degradation products of natural rubbers, diene polymers, and poly(($C_2$–$C_4$)-monoolefins), the extent of degradation of said degradation products being such that a solution of the degraded polymer in mineral spirits at 25° C. and a concentration of 10% has a viscosity from 1 cp. to 1,200 cps., and (2) about 0.1 to 5% by weight, based on the weight of the dissolved polymer (1), of an additional polymerization catalyst selected from the group consisting of free-radical initiators, Friedel-Crafts catalysts, and anionic polymerization catalysts, of polymerizable monoethylenically unsaturated monomeric material to produce a dispersed particulate polymeric material insoluble in the medium.

As disclosed in those applications, the use of hydrocarbon solvents for the preparation of the polymer dispersions is particularly advantageous and the hydrocarbons used may be aliphatic (acyclic or alicyclic), aromatic, naphthenic, or mixtures. Examples of individual hydrocarbons that may be employed include pentane, n-hexane, cyclohexane, n-heptane, n-octane, iso-octane, benzene, toluene, xylene (o-, m-, or p-xylene). Commercially-available hydrocarbon mixtures may be employed such as mineral spirits, gasoline, xylene mixtures, terpenes, solvent naphthas of aromatic, aliphatic, or naphthenic character, alkyl benzenes in which the alkyl group or groups have from 1 to 4 carbon atoms, octane fractions which contain a mixture of octane isomers, and so on. Generally, it is preferred to employ a hydrocarbon liquid medium comprising at least 50% by weight of non-aromatic components, and especially those of aliphatic or paraffinic make-up. This preference has the advantage of lower cost and capacity to disperse a wider variety of polymers in the form of discrete particles.

It is essential that the hydrocarbon be of liquid character, but it may have a wide boiling range from a minimum of about −50° C. (in which case high pressures may be needed in the polymerization) to a maximum which may be as high as 300° C. For most purposes, the boiling point should be from about 0° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35° C. may be preferred. A similar boiling point range may be selected for pressure systems, s as in aerosol sprays. On the other hand, where the coating and impregnating operation is to be carried out in equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

It is essential to select the hydrocarbon with the particular polymer to be prepared therein in mind. The hydrocarbon medium should be such that the polymer formed is relatively insoluble therein. This does not preclude the use of a hydrocarbon medium capable of swelling the polymer or of dissolving in the polymer up to 1% or even 50% on the weight of the polymer. A small proportion up to 10% of the polymer prepared may be of low molecular weight and soluble in the hydrocarbon medium. When the polymer prepared in the system has an appreciable solubility within the hydrocarbon medium, that portion which dissolves serves to thicken the system. By employing a composite hydrocarbon medium in which one of the components exerts a solvent action on the polymer and the other is substantially completely inert, controlled viscosity can be obtained merely by adjusting the proportions of the two components of the mixture. For example, a mixture of octane and toluene may be employed for the preparation of a dispersion of a polymer which has complete solubility in toluene and substantially no solubility in octane. By increasing or decreasing the proportion of toluene in the system, the viscosity in the system may be varied as desired from a very high value down to a very low value approaching that of the liquid used for the vehicle. In all of the systems of the present invention, the largest portion of the polymer, at least 90% by weight thereof, remains in undissolved condition dispersed in the system as discrete particles having sizes of 10 microns or less, and preferably from about 0.1 to 2 microns, by a dispersant more particularly described hereinafter.

The nature of the dispersing agent used depends on the solvent medium and the particular polymer dispersed. For the preferred hydrocarbon solvent media, the dispersing agent is of hydrophobic character and contains in its molecule two essentially different portions or components, one of which is preferentially soluble in, or miscible with, the hydrocarbon medium at least to that degree which would result in the formation of a colloidal solution thereof, which portion may or may not be incompatible with the polymer to be dispersed which may be termed the main or primary polymer in the system. The other component or portion of the polymeric dispersing agent molecule is preferentially soluble in, or miscible with, the main polymer which portion may or may not be incompatible with the hydrocarbon medium. Thus, the first-mentioned portion has a stronger affinity for the hydrocarbon medium than the other, whereas the second-mentioned portion has a stronger affinity for the main polymer. The second-mentioned component of the dispersant may be introduced into the polymeric dispersing agent molecule by a grafting operation wherein there is used a monomer which is of the same chemical constitution, or of sufficiently similar chemical constitution, as that of the monomer or monomers employed in the formation of the main polymer so that the portion of the dispersing agent molecule derived therefrom is compatible or miscible with the main or primary polymer.

The formation of the dispersing agent may be effected in situ simultaneously with the main polymerization. Alternatively, the dispersing agent may be formed by a separate preliminary graft polymerization and then introduced into the main polymerization system. Any of the dispersing agents disclosed in the two copending applications mentioned hereinabove may be used and the oxidative degradation products of rubbers and olefin polymers disclosed in Serial No. 53,377 are especially advantageous.

Any dispersed polymer may be used and it may be formed from one or more of a wide variety of monomers, such as the vinyl esters of fatty acids having from 1 to 18 carbon atoms including vinyl acetate, vinyl propionate, vinyl butyrate, vinyl laurate, vinyl oleate, and vinyl stearate and lower alkyl vinyl ethers in which the alkyl group has 1 to 4 carbon atoms, such as the methyl, ethyl, propyl, isopropyl, n-butyl, sec-butyl, isobutyl, and tert-butyl vinyl ethers. Itaconic acid esters, esters of a α-cyano-acrylic acid, and esters of acrylic acid or of methacrylic acid with phenol or alcohols having from 1 to 18 carbon atoms may likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Acrylonitrile, metacrylonitrile, acrylamide, methacrylamide, styrene, a-methyl styrene, vinyle toluenes, acrylic acid, acrylic acid anhydride, methacrylic acid, methacrylic acid anhydride, fumaric acid, crotonic acid, allyl acetate, glycidyl methacrylate, t-butyl-aminoethyl methacrylate, hydroxyalkyl acrylates or methacrylates such as β-hydroxy-ethyl methacrylate, β-hydroxyethyl vinyl ether, β-hydroxyethyl vinyl sulfide vinyl pyrrolidone, N,N-dimethylaminoethyl methacrylate, ethylene, propylene, p - methoxy - α - methylstyrene, vinylidene cyanide, α - trifluoromethyl - acrylonitrile, N,N - dialkylacrylamides, N,N - dialkyl - methacrylamides, vinyl chloride, vinyl fluoride, vinylidene fluoride, hexafluoropropylene, chlorotrifluoroethylene, and tetrafluoroethylene may also be used as the monomers for making the main polymer. Also copolymers of any one or more of the above-mentioned monomers with up to 50 mole percent of maleic anhydride may be used.

A wide variety of complemental materials may be added to the aqueous dispersion before removing solvent. The compositions obtained by the addition of the complemental material and subsequent removal of solvent have a wide variety of uses including potting compounds for molding or casting, as coatings, impregnating compositions, and adhesives, as caulking and sealing compositions, or components thereof, as hydraulic transmission fluids, drying lacquers, paints, or enamels, baking enamels, lubricants and sizes for textile materials, such as loose fibers, yarns, or threads for making them more amenable to such textile operations as drawings, twisting, weaving, or knitting, binders for non-woven fabrics and to unify fibrous backings for masking tape, impregnants for stabilizing wool against shrinkage on washing, compositions for creaseproofing cellulosic fabrics, as finishes to render textiles, paper, and leather waterproof or water-repellent, to impregnants to improve the hand, softness and resistance to abrasion of fabrics, and to improve wet and dry strengths of paper, as polishes for shoes, metals, floors, and furniture, as well as many other uses.

Valuable compositions are also obtained by using drying or semi-drying oils as the complement. Examples iinclude linseed, refined bodied (by oxidation) safflower oil, soybean oil, dehydrated caster oil, cottonseed oil, tung oil, oiticica oil, and various other oils such as fish liver oils, or mixtures of drying and non-drying oils comprising a predominant proportion of the drying component. The amount of the oil of drying type may be from 25 to 99.9% of the total weight of dispersed polymer and complement. Optionally, these compositions may also be provided with a small amount of a drier, such as from 0.01 to 10%, and preferably about 0.1 to 0.2%, based on the weight of oil, of manganese naphthenate or cobalt naphthenate. These compositions are useful for coating, impregnating, molding, or casting purposes. They set or cure on air-drying or they may be baked.

Besides using refined or bodied oils, they may be modified by reaction with a monoethylenically unsaturated monomer, such as styrene, methyl methacrylate, maleic acid or anhydride, vinyltoluene, etc., in the presence of a free radical initiator, such as benzoyl peroxide, before being introduced into the polymer dispersion. Similar products are obtained if, after introducing the ordinary refined or bodied oil into the polymer dispersion and removing solvent, the monomer and free radical catalyst is introduced into the resulting dispersion of polymer in oil so that the monomer reacts with the oil, the reaction being assisted by heating, if necessary.

Another complemental material of highly useful type is a polymerizable ethylenically unsaturated monomer preferably having a single $H_2C=C<$ group. The monomer used may be any one, or any mixture of two or more, of the monomers mentioned hereinbefore as being useful for making the dispersed polymer. However, the monomer or monomers used in a given polymer dispersion must have a boiling point sufficiently above that of the solvent to be removed to make it possible to evaporate the solvent without removing all or an excessive amount of monomer. Examples of monomers include vinyl stearate, stearyl acrylate, stearyl methacrylate, lauryl acrylate, lauryl methacrylate, octyl acrylate, octyl methacrylate, 2-ethylhexyl acrylate, 2-ethylhexyl methacrylate, isobornyl acrylate, isobornyl methacrylate, n-hexyl methacrylate, and vinyl octadecyl ether.

After the complemental material is added to the non-aqueous polymer dispersion, solvent is removed by heating to evaporate it.

Substantially all of the solvent may thus be removed but the removal of all of the solvent is not essential to produce the novel and advantageous compositions of the type involved in the present invention wherein the polymer is dispersed in a non-volatile component of the composition which non-volatile component is, or is converted into, a permanent part of the coating, impregnant, or otherwise formed article derived from the composition. Characteristically, the complement makes up the predominating proportion of the total of the solvent and the complement. In general, the compositions obtained in accordance with the present invention contain not over 25% by weight of volatile solvent (excluding volatile monomer added as a complemental material), based on total weight of dispersed polymer, complemental material, and residual solvent (excluding monomer), when the dispersed polymer is not over 45% by weight of the aforesaid total, and for most compositions the residual solvent (excluding monomer) does not exceed 10% by weight of the total, and ordinarily is less than 3% on this basis.

Before or after the solvent has been evaporated off to the desired extent, the composition may be further modified by the inclusion of dyes, delustrants, fillers, pigments, cure-accelerators, mold release agents, bactericides, fungicides, insecticides, thickening agents, etc.

After application of the composition for coating, impregnating, molding, or other related purposes, it may be subjected to heat to assist in the setting or curing of complemental materials and/or of the dispersed polymer if it happens to be of reactive type. The heating may be from about 80° C. to 350° C., but should not be so intense or prolonged as to damage any substrates coated or impregnated, such as paper, textiles, or leather. The time of heating may be several minutes, such as 2 to 5 or 10 minutes at the upper limit of the temperature given to a half hour or more at the lower limit.

The typical composition of the present invention is a dispersion of the particles of polymer (obtained from the initial dispersion thereof in a volatile organic solvent) in the complemental material. By the method of the present invention it is possible to obtain compositions containing a much wider range of proportions of polymer in any particular complemental material than can be obtained by the use of organic solvent solutions of the polymer and complemental materials. Less difficulty with high viscosity is also encountered with these novel dispersions even though the compositions have only a low proportion of volatile organic solvent at the most. Also, certain of these systems are capable of producing good moldings and castings because of the fact that they can be made substantially free of volatile solvent.

The following examples are illustrative of the invention, the parts and percentages being by weight unless otherwise indicated:

EXAMPLE A

Into a suitable reaction vessel were placed 300 parts of a 10% solution of pale crepe rubber in mineral spirits, which had been treated with sufficient ozone, 550 parts of mineral spirits, and 1.0 part of lauroyl peroxide. This mixture was heated with agitation in an atmosphere of nitrogen for one hour at 100° C. Then a mixture of 260 parts of methyl methacrylate and 260 parts of ethyl acrylate containing 5.2 parts of benzoyl peroxide was added gradually at 90° C. over a period of four hours. The mixture was heated with stirring for an additional three hours at 90° C., during which time 2.0 parts of lauroyl peroxide were added in 12 equal parts every 15 minutes. The product was a milky white very fluid dispersion containing 39.1% solid material.

EXAMPLE B (a) A solution of 100 parts of poly(isobutylene) (Enjay 035 Butyl Rubber) and 1.2 parts of lauroyl peroxide in 900 parts of mineral spirits boiling in the range of 310° to 394° F. was heated to 100° C. while air was bubbled through the solution until the viscosity of the rubber solution had dropped from 373 cps. to 1 centipoise.

(b) Three hundred and thirty parts of the above oxidized butyl rubber solution, 303 parts of the same mineral spirits, and 0.5 part of lauroyl peroxide were mixed, deaerated with nitrogen and heated to 100° C. for one hour. The temperature was lowered to 90° C. and a mixture of 141.8 parts of methyl methacrylate, 141.8 parts of ethyl acrylate, and 0.4 part of benzoyl peroxide was added over the course of two hours. A mixture of 141.8 parts of ethyl acrylate, 141.8 parts of methyl methacrylate, 0.4 part of benzoyl peroxide, and 275 parts of aliphatic hydrocarbon solvent naphtha boiling in the range of 244° to 291° F. was added over the course of two hours. A solution of 1.2 parts of lauroyl peroxide in 25 parts of the same solvent naphtha was then added over the course of three hours. The polymer dispersion was concentrated to 58.1% solids by removing the naphtha and residual monomer by distillation under reduced pressure. The resulting dispersion was stable and had a viscosity (Brookfield of 480 cps.).

EXAMPLE C

Six hundred and thirty-three parts of a 5.5% solution of milled pale crepe rubber solution in mineral spirits were ozonized for 10 seconds at room temperature so that approximately 10% of the residual double bonds were reacted. Then the reaction vessel was swept with nitrogen and the solution heated to 90° C. with stirring. Then a mixture of 141.8 parts methyl methacrylate, 70.8 parts ethyl acrylate, 70.8 parts 2-ethylhexyl acrylate, and 0.4 part benzoyl peroxide were added all at once, and the mixture heated and stirred for 45 minutes. Then an equal amount of the same mixture of monomers containing in addition 275 parts aliphatic hydrocarbon solvent naptha boiling in the range of 244° to 291° F. was added gradually over a period of two hours. The reaction mixture was then treated with a solution of 1.2 parts lauroyl peroxide in 25 parts of the same naphtha over four hours in 16 equal increments. The conversion of monomer to polymer was 90%.

EXAMPLE D

A 10% solution of milled pale crepe rubber in mineral spirits was prepared. This had a viscosity of 1,800 cps. Two thousand parts of this solution were heated at 100° C. for one hour in the presence of 1.22 parts of lauroyl peroxide while air was bubbled through the solution at the rate of 2 parts (by volume) per minute. Two and one-half parts of lauroyl peroxide, 1533 parts of mineral spirits boiling in the range of 310° F. to 394° F., and 1632 parts of the oxidized rubber solution were mixed and heated to 100° C. with stirring under an atmosphere of nitrogen. A solution of 1.5 parts of benzoyl peroxide in 477 parts of ethyl acrylate and 583 parts methyl methacrylate was added with stirring and the temperature was adjusted to 90° C. A solution of 2.5 parts of benzoyl peroxide in 799 parts of ethyl acrylate, 977 parts of methyl methacrylate, and 1440 parts of aliphatic hydrocarbon solvent naphtha boiling in the range of 244° F. to 291° F., was added over the course of three hours at 90° C. with stirring. The mixture was heated for one hour and a solution of 6 parts of lauroyl peroxide in 60 parts of the same solvent naphtha was added over the course of three hours. The mixture was heated at 90° C. for one hour, and residual monomer and some residual solvent naphtha were removed by distillation under reduced pressure. The resulting polymer dispersion had 49.6% total solids.

Example I

In a suitable vessel, equipped for vacuum distillation, were placed 800 parts of alkali-refined linseed oil and 3070 parts of a non-aqueous dispersion of a copolymer of methyl methacrylate and ethyl acrylate insoluble in the medium (prepared according to Example A above). The mixture was heated with stirring and vacuum applied until all the aliphatic solvent had been removed. The finished product was then a dispersion containing 60% solid acrylic polymer in linseed oil (40%) and its viscosity was 3550 cps. When this material was coated on glass and metal plates and baked for 30 minutes at 300° F. it dried to a clear, tough coherent film without added drier. By contrast, linseed oil alone remains as a liquid upon being given such treatment. With a trace of added drier this material was used as a clear coating for California redwood. The coating had good resistance to weathering.

Example II

In a suitable vessel, equipped for vacuum distillation, were placed 1000 parts of alkali-refined safflower oil and 1720 parts of non-aqueous dispersion of a copolymer of methyl methacrylate and ethyl acrylate insoluble in the medium (prepared according to Example B above). The mixture was heated with stirring and vacuum applied until all the aliphatic solvent had been removed. The finished material was a low viscosity fluid dispersion of 50% solid polymer in safflower oil. An air-drying white enamel was prepared in the following manner: 320 parts of rutile titanium dioxide and 172.6 parts of the dispersion in safflower oil were ground on a roller mill until a smooth pigmented paste was obtained then this was mixed with 469.0 parts of the dispersion in safflower oil to which had been added 1.0 part of a 6% cobalt naphthenate solution. The viscosity of the enamel could be lowered by the addition of mineral spirits, however, it was very satisfactory as made and gave a very glossy and well-adhered coating on wood which was dry to the touch in 6 to 8 hours.

Example III

In a suitable vessel, equipped for vacuum distillation, were placed 500 parts of Q-bodied linseed oil and 642.0 parts of a non-aqueous dispersion of a copolymer of methyl methacrylate and ethyl acrylate insoluble in the medium prepared according to Example A above except that the monomers used consisted of a mixture of 85% ethyl acrylate and 15% methyl methacrylate. The mixture was heated with stirring and vacuum applied until sufficient solvent had been removed to give a product which was 75.5% non-volatile.

93 parts of this material was mixed with 5 parts of Prussian blue and 5 parts of carbon black and used for the preparation of the second and the final finishing varnish or Japan coat for patent leather. Very smooth finishes with no cracking were obtained after the final stoving.

Another portion of the 75.5% non-volatile dispersion was subjected to vacuum until the product was reduced to 98.5% non-volatile. This material was applied in the same way and produced similar results.

Example IV (a) In a suitable vessel, equipped for vacuum distillation, were placed 750 parts of China-wood or tung oil, 250 parts of dehydrated castor oil, and 1470 parts of a non-aqueous dispersion of a copolymer of methyl methacrylate, ethyl acrylate, and 2-ethylhexyl acrylate (prepared according to Example C above). The mixture was heated with stirring and vacuum applied until all the aliphatic solvent had been removed. The finished product was a dispersion containing 2 parts of oil to 1 part of acrylic polymer solids.

(b) The material obtained in part (a) was used directly in making a varnish by mixing 3 parts thereof with one part of a soluble p-amylphenol-formaldehyde, diluting with 2 parts of mineral spirits.

(c) A varnish was made by mixing 2 parts of the dispersion obtained in part (a) with 1 part of a natural medium-hard copal resin and 2 parts of mineral spirits.

Example V

In a suitable vessel, equipped for vacuum distillation, were placed 500 parts of alkali-refined soybean oil and 860 parts of a non-aqueous dispersion of a copolymer of methyl methacrylate and ethyl acrylate insoluble in the medium (prepared according to Example B above). The mixture was heated with stirring and vacuum applied until all the aliphatic solvent had been removed. The finished product was then a very fluid dispersion containing 50% solid acrylic polymer in soybean oil. Thirty parts of this material was ground with 40 parts of finely-divided calcium carbonate, 30 parts of rutile titanium dioxide and 0.50 part of a 6% cobalt naphthenate solution to give a very white paste which was easily expressed from a caulking gun. The caulking dried to a firm condition in 16 hours but did not become brittle.

Example VI (a) In a suitable vessel, equipped for vacuum distillation, were placed 500 parts of refined castor oil and 642.0 parts of a non-aqueous dispersion of a copolymer of methyl methacrylate and ethyl acrylate insoluble in the medium (prepared according to Example A above), except that the monomers used consisted of 65% ethyl acrylate, 30% methyl methacrylate and 5% 2-hydroxyethoxyethyl acrylate. The mixture was heated with stirring and vacuum applied until all of the aliphatic solvent had been removed. This material (146 parts) was reacted with 260 parts of toluene diisocyanate at a temperature of 80° C. for 45 minutes to prepare a prepolymer, which was then mixed with 18 parts of water, 9 parts of triethylamine, 2 parts of triethanolamine and 12 parts of an ethylene oxide condensate of glyceryl trioleate containing about 20 oxyethylene groups, to give a rigid polyurethane foam with greatly improved impact strength when compared with a foam prepared from an unmodified castor oil prepolymer.

(b) The prepolymer prepared in part (a) was also blended with an equal weight of castor oil to make a solvent-resistant enamel for coating electrical wires.

Example VII

In a vessel, suitable for vacuum distillation, containing an agitator and thermometer were placed 3500 parts of refined castor oil and 6040 parts of a non-aqueous dispersion of a copolymer of methyl methacrylate and ethyl acrylate insoluble in the medium (prepared according to Example B above). The mixture was heated with agitation under vacuum until all of the aliphatic solvent was removed. This gave a viscous paste which was applied to glass and metal. When coated pieces were heated to 350° F. for 3–5 minutes the coating underwent fusion. When cooled a clear, dry, firm film was obtained which was strippable. A portion of the viscous paste was worked on a hot (350° F.) rubber mill to give large sheets of strong, clear film.

Example VIII

In a vessel, suitable for vacuum distillaton, equipped with an agitator were placed 300 parts of winterized cottonseed oil, 100 parts refined linseed oil and 1765 parts of a non-aqueous dispersion of a copolymer of methyl methacrylate, ethyl acrylate, and 2-ethylhexyl acrylate, (prepared according to Example C above). The mixture was heated with agitation under vacuum until all of the aliphatic solvent was removed. This gave a fluid dispersion of 60% solid polymer in cottonseed oil (40%). Three hundred parts of this material containing 3.0 parts of a 6% cobalt naphthenate solution was ground on a roller mill with 630 parts of rutile titanium dioxide and 70 parts of zinc oxide to give a white paste. This putty-like material was used as a glazing compound which dried firm, but remained quite flexible.

*Example IX*

In a suitable vessel, equipped for vacuum distillation, were placed 1000 parts of octyl methacrylate and 2000 parts of non-aqueous dispersion of a terpolymer of 60% methyl methacrylate, 30% ethyl acrylate and 10% acrylonitrile (prepared according to B above but having 50% solids). The mixture was heated with stirring and vacuum applied until all of the aliphatic hydrocarbon had been removed. On cooling to room temperature the finished product was a fluid milky-white dispersion of 50% solid polymer dispersed in a polymerizable monomer. One-half part of lauroyl peroxide was dissolved in fifty parts of the dispersion and the mixture heated at 80° C. in a closed mold. After 5 hours the material had polymerized to an opaque solid which had good impact resistance.

*Example X*

(a) One hundred thirty parts of Buton A–500 (a styrenebutadiene copolymer having a viscosity of about 4300 poises at 20° C.) and 260 parts of a 1/1 methyl methacrylate/ethyl acrylate copolymer dispersion in mineral spirits (49.5% solids and prepared as in Example 1 of Serial No. 53,377) were mixed. The mineral spirits was removed by distillation to give a bluish-white, viscous dispersion. One part of this dispersion was mixed with 0.01 part of cobalt naphthenate and cast as a film. Upon drying, a hard, flexible film was obtained.

(b) A mixture of 5 parts vinyltoluene and 5 parts of Buton A–500 was added to 10 parts of the dispersion obtained in part (a) hereof. A stable dispersion resulted. The resulting product was polymerized by heating to 150° C. after adding 0.1 part of di-t-butylperoxide and casting the dispersion as a film on a steel plate.

We claim:

1. As a composition of matter, an anhydrous dispersion comprising
   (A) a polymerizable material selected from the group consisting of
      (1) monoethylenically unsaturated monomers having an $H_2C=C<$ group,
      (2) drying oils selected from the group consisting of vegetable and animal drying oils, and
      (3) such drying oils modified by reaction with such a monoethylenically unsaturated monomer and
   (B) a dispersed particulate polymeric material obtained by the polymerization of monomeric material (M) in an anhydrous volatile liquid hydrocarbon solvent medium containing dissolved therein
      (1) a hydrocarbon-soluble polymer selected from the group consisting of
         (a) natural rubbers,
         (b) diene polymers,
         (c) polyisobutylenes,
         (d) oil-soluble polymers formed exclusively of monoethylenically unsaturated molecules comprising at least one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers, and
         (e) oxidative degradation products of natural rubbers, diene polymers, and poly($(C_2-C_4)$-monoolefins),
      the extent of degradation being such that a solution of the degraded polymer in mineral spirits at 25° C. and a concentration of 10% has a viscosity from 1 cp. to 1,200 cps. and
      (2) about 0.1 to 5% by weight, based on the weight of the dissolved polymer (1), of an addition polymerization catalyst selected from the group consisting of free-radical initiators, Friedel-Crafts catalysts, and anionic polymerization catalysts, said monomeric material (M) comprising at least one monoethylenically unsaturated monomer selected from the group consisting of vinyl esters of a fatty acid having 1 to 18 carbon atoms, esters of acrylic acid with an alcohol having 1 to 18 carbon atoms, esters of methacrylic acid with an alcohol having 1 to 18 carbon atoms, phenyl acrylate, phenyl methacrylate, acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, fumaric acid, crotonic acid, allyl acetate, glycidyl methacrylate, t-butylaminoethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, tetrafluoroethylene, lower alkyl vinyl ethers in which the alkyl group has 1 to 4 carbon atoms, p-methoxy-α-methylstyrene, vinylidene cyanide, α-trifluoromethylacrylonitrile, N,N-dialkylacrylamides, and N,N-dialkylmethacrylamides, the proportion of polymerizable material (A) supra being at least 3% by weight of the total weight of (A) and polymeric material of (B) supra, and the polymeric material of (B) being dispersed in at least one of the materials selected from the group consisting of (A) and the aforesaid liquid hydrocarbon solvent.

2. A composition as defined in claim 1 in which the particulate polymeric material (B) is dispersed in the polymerizable material (A).

3. As a composition of matter, an anhydrous dispersion comprising
   (A) at least one monoethylenically unsaturated monomer having an $H_2C=C<$ group, and
   (B) a dispersed particulate polymeric material obtained by the polymerization of monomeric material (M) in an anhydrous volatile liquid hydrocarbon solvent medium containing dissolved therein
      (1) a hydrocarbon-soluble polymer selected from the group consisting of
         (a) natural rubbers,
         (b) diene polymers,
         (c) polyisobutylenes,
         (d) oil-soluble polymers formed exclusively of monoethylenically unsaturated molecules comprising at least one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers,
         (e) oxidative degradation products of natural rubbers, diene polymers, and poly($(C_2-C_4)$-monoolefins)

the extent of degradation being such that a solution of the degraded polymer in mineral spirits at 25° C. and a concentration of 10% has a viscosity from 1 cp. to 1,200 cps. and
      (2) about 0.1 to 5% by weight, based on the weight of the dissolved polymer (1), of an addition polymerization catalyst selected from the group consisting of free-radical initiators, Friedel-Crafts catalysts, and anionic polymerization catalysts, said monomeric material (M) comprising at least one monoethylenically unsaturated monomer selected from the group consisting of vinyl esters of a fatty acid having 1 to 18 carbon atoms, esters of acrylic acid with an alcohol having 1 to 18 carbon atoms, esters of methacrylic acid with an alcohol having 1 to 18 carbon atoms, phenyl acrylate, phenyl methacrylate, acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, fumaric acid, crotonic acid, allyl acetate, glycidyl methacrylate, t-butylaminoethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, tetrafluoroethylene, lower alkyl vinyl ethers in which the alkyl group has 1 to 4 carbon atoms, p-methoxy-α-methylstyrene, vinylidene cyanide, α-trifluoromethylacrylonitrile, N,N-dialkylacrylamides, and N,N-dialkylmethacrylamides, the proportion of polymerizable material (A) supra being at least 3% by weight of the total weight of (A) and polymeric material of (B) supra, the polymeric material of (B) having dispersed discrete particles of a size of about 0.1 to 10 microns and being dispersed in at least one of the materials selected from the group consisting of (A) and the aforesaid liquid hydrocarbon solvent.

4. A composition as defined in claim 3 in which the particulate polymeric material (B) is dispersed in the polymerizable material (A).

5. A composition according to claim 3 in which the monomeric material of (A) is octyl methacrylate.

6. A composition according to claim 3 in which the monomeric material of (A) is vinyl toluene.

7. A composition according to claim 3 in which the monomeric material of (A) is at least one ester of an acid of the formula

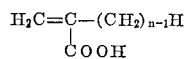

in which $n$ is an integer having a value of 1 to 2 with a saturated aliphatic alcohol having 1 to 18 carbon atoms.

8. A composition as defined in claim 7 in which the particulate polymeric material (B) is dispersed in the polymerizable material (A).

9. As a composition of matter, an anhydrous dispersion comprising
(A) a drying oil selected from the group consisting of vegetable and animal drying oils and
(B) a dispersed particulate polymeric material obtained by the polymerization of monomeric material (M) in an anhydrous volatile liquid hydrocarbon solvent medium containing dissolved therein
(1) a hydrocarbon-soluble polymer selected from the group consisting of
(a) natural rubbers,
(b) diene polymers,
(c) polyisobutylenes,
(d) oil-soluble polymers formed exclusively of monoethylenically unsaturated molecules comprising at least one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers,
(e) oxidative degradation products of natural rubbers, diene polymers, and poly((C$_2$–C$_4$)-monoolefins), the extent of degradation being such that a solution of the degraded polymer in mineral spirits at 25° C. and a concentration of 10% has a viscosity from 1 cp. to 1,200 cps. and (2) about 0.1 to 5% by weight, based on the weight of the dissolved polymer (1), of an addition polymerization catalyst selected from the group consisting of free-radical initiators, Friedel-Crafts catalysts, and anionic polymerization catalysts, said monomeric material (M) comprising at least one monoethylenically unsaturated monomer selected from the group consisting of vinyl esters of a fatty acid having 1 to 18 carbon atoms, esters of acrylic acid with an alcohol having 1 to 18 carbon atoms, esters of methacrylic acid with an alcohol having 1 to 18 carbon atoms, phenyl acrylate, phenyl methacrylate, acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, fumaric acid, crotonic acid, allyl acetate, glycidyl methacrylate, t-butylaminoethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, tetrafluoroethylene, lower alkyl vinyl ethers in which the alkyl group has 1 to 4 carbon atoms, p-methoxy-α-methylstyrene, vinylidene cyanide, α-trifluoromethylacrylonitrile, N,N - dialkylacrylamides, and N,N - dialkylmethacrylamides, the proportion of polymerizable material (A) supra being at least 3% by weight of the total weight of (A) and polymeric material of (B) supra, the polymeric material of (B) having dispersed discrete particles of a size of about 0.1 to 10 microns and being dispersed in at least one of the materials selected from the group consisting of (A) and the aforesaid liquid hydrocarbon solvent.

10. A composition as defined in claim 9 in which the particulate polymeric material (B) is dispersed in the polymerizable material (A).

11. A method comprising the steps of
(I) adding a polymerizable material (A) selected from the group consisting of
(1) monoethylenically unsaturated monomers having an H$_2$C=C< group,
(2) drying oils selected from the group consisting
(3) such drying oils modified by reaction with such a monoethylenically unsaturated monomer to
a dispersed particulate polymeric material (B) obtained by the polymerization of monomeric material (M) in an anhydrous volatile liquid hydrocarbon solvent medium containing dissolved therein
(1) a hydrocarbon-soluble polymer selected from the group consisting of
(a) natural rubbers,
(b) diene polymers,
(c) polyisobutylenes,
(d) oil-soluble polymers formed exclusively of monoethylenically unsaturated molecules comprising at least one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers,
(e) oxidative degradation products of natural rubbers, diene polymers, and poly((C$_2$–C$_4$)-monoolefins)

the extent of degradation being such that a solution of the degraded polymer in mineral spirits at 25° C. and a concentration of 10% has a viscosity from 1 cp. to 1,200 cps. and (2) about 0.1 to 5% by weight, based on the weight of the dissolved polymer (1), of an addition polymerization catalyst selected from the group consisting of free-radical initiators, Friedel-Crafts catalysts, and anionic polymerization catalysts, said monomeric material (M) comprising at least one monoethylenically unsaturated monomer selected from the group consisting of vinyl esters of a fatty acid having 1 to 18 carbon atoms, esters of acrylic acid with an alcohol having 1 to 18 carbon atoms, esters of methacrylic acid with an alcohol having 1 to 18 carbon atoms, phenyl acrylate, phenyl methacrylate, acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, fumaric acid, crotonic acid, allyl acetate, glycidyl methacrylate, t-butylaminoethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, tetrafluoroethylene, lower alkyl vinyl ethers in which the alkyl group has 1 to 4 carbon atoms, p-methoxy-α-methylstyrene, vinylidene cyanide, α-trifluoromethylacrylonitrile, N,N - dialkylacrylamides, and N,N - dialkylmethacrylamides, the proportion of polymerizable material (A) supra being at least 3% by weight of the total weight of (A) and polymeric material of (B) supra, and (II) then removing hydrocarbon solvent to disperse the polymeric material (B) in polymerizable material (A).

12. As a composition of matter, an anhydrous dispersion comprising (A) a polymerizable material selected from the group consisting of
  (1) monoethylenically unsaturated monomers having an H₂C=C< group,
  (2) drying oils selected from the group consisting of vegetable and animal drying oils, and
  (3) such drying oils modified by reaction with such a monoethylenically unsaturated monomer and (B) a dispersed particulate polymeric material obtained by the polymerization of monomeric material comprising at least one ester of an acid of the formula

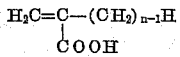

in which n is an integer having a value of 1 to 2 with a saturated aliphatic alcohol having 1 to 18 carbon atoms in an anhydrous volatile liquid hydrocarbon solvent medium containing dissolved therein (1) a hydrocarbon-soluble polymer selected from the group consisting of
  (a) natural rubbers
  (b) diene polymers,
  (c) polyisobutylenes,
  (d) oil-soluble polymers formed exclusively of monoethylenically unsaturated molecules comprising at least one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers, and
  (e) oxidative degradation products of natural rubbers, diene polymers, and poly ((C₂-C₄)-monoolefins), the extent of degradation being such that a solution of the degraded polymer in mineral spirits at 25° C. and a concentration of 10% has a viscosity from 1 cp. to 1,200 cps. and (2) about 0.1 to 5% by weight, based on the weight of the dissolved polymer (1), of an addition polymerization catalyst selected from the group consisting of free-radical initiators, Friedel-Crafts catalysts, and anionic polymerization catalysts, the proportion of polymerizable material (A) supra being at least 3% by weight of the total weight of (A) and polymeric material of (B) supra, and the polymeric material of (B) being dispersed in at least one of the materials selected from the group consisting of (A) and the aforesaid liquid hydrocarbon solvent.

13. A composition as defined in claim 12 in which the particulate polymeric material (B) is dispersed in the polymerizable material (A).

References Cited in the file of this patent
UNITED STATES PATENTS

| | | |
|---|---|---|
| 2,201,273 | Schoenfeld | May 21, 1940 |
| 2,837,496 | Vanderberg | June 3, 1958 |
| 2,849,410 | Lamm | Aug. 26, 1958 |
| 2,858,281 | Bauman et al. | Oct. 28, 1958 |
| 2,946,702 | Bach | July 26, 1960 |
| 2,964,486 | Bernier | Dec. 13, 1960 |
| 2,970,978 | Powers | Feb. 7, 1961 |
| 3,095,388 | Osmond et al. | June 25, 1963 |